Nov. 30, 1937.  A. DAVIS, JR  2,100,383
TRUCK TANK AND CAB
Filed April 6, 1934  2 Sheets-Sheet 1
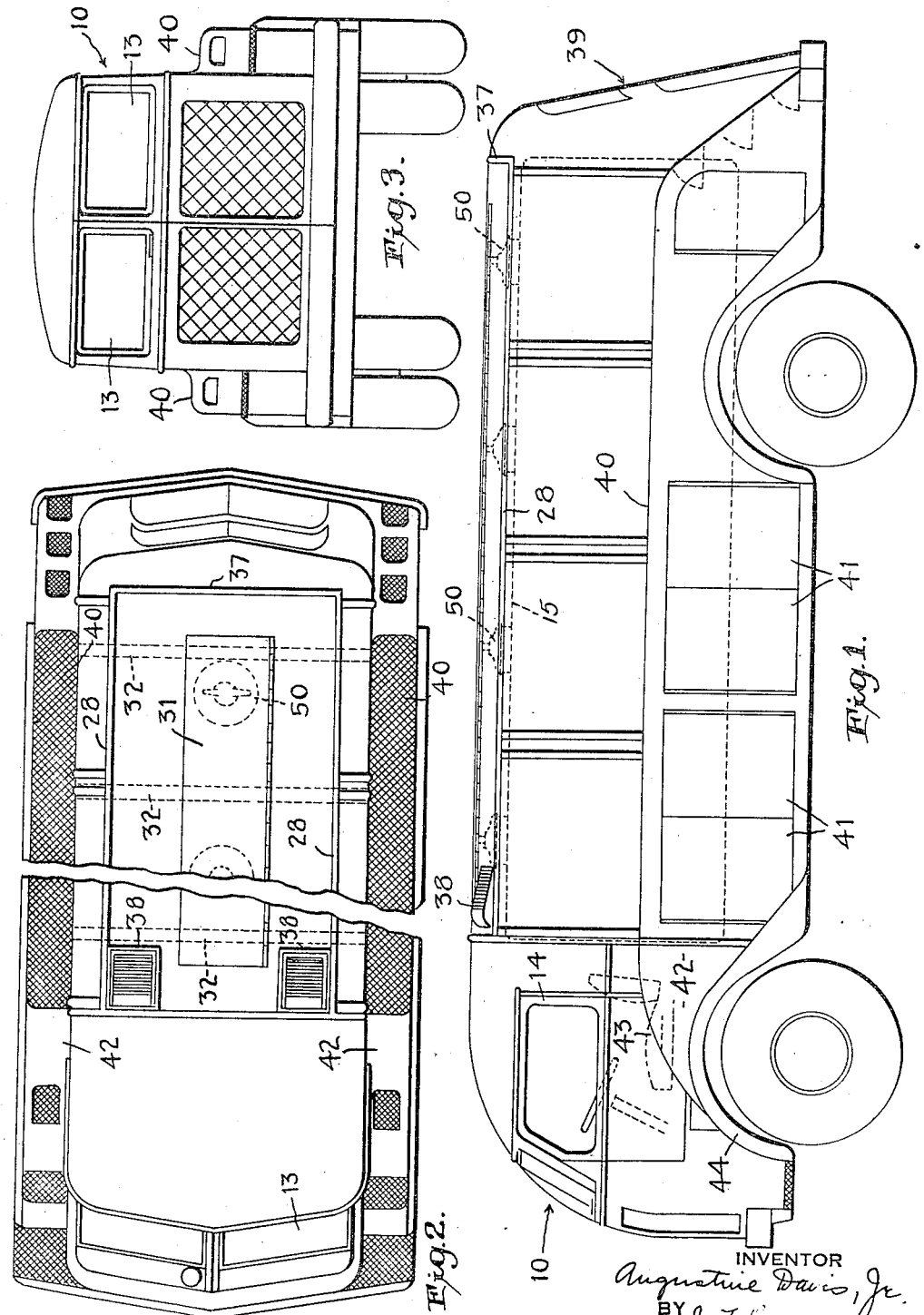

Nov. 30, 1937.  A. DAVIS, JR  2,100,383
TRUCK TANK AND CAB
Filed April 6, 1934  2 Sheets-Sheet 2
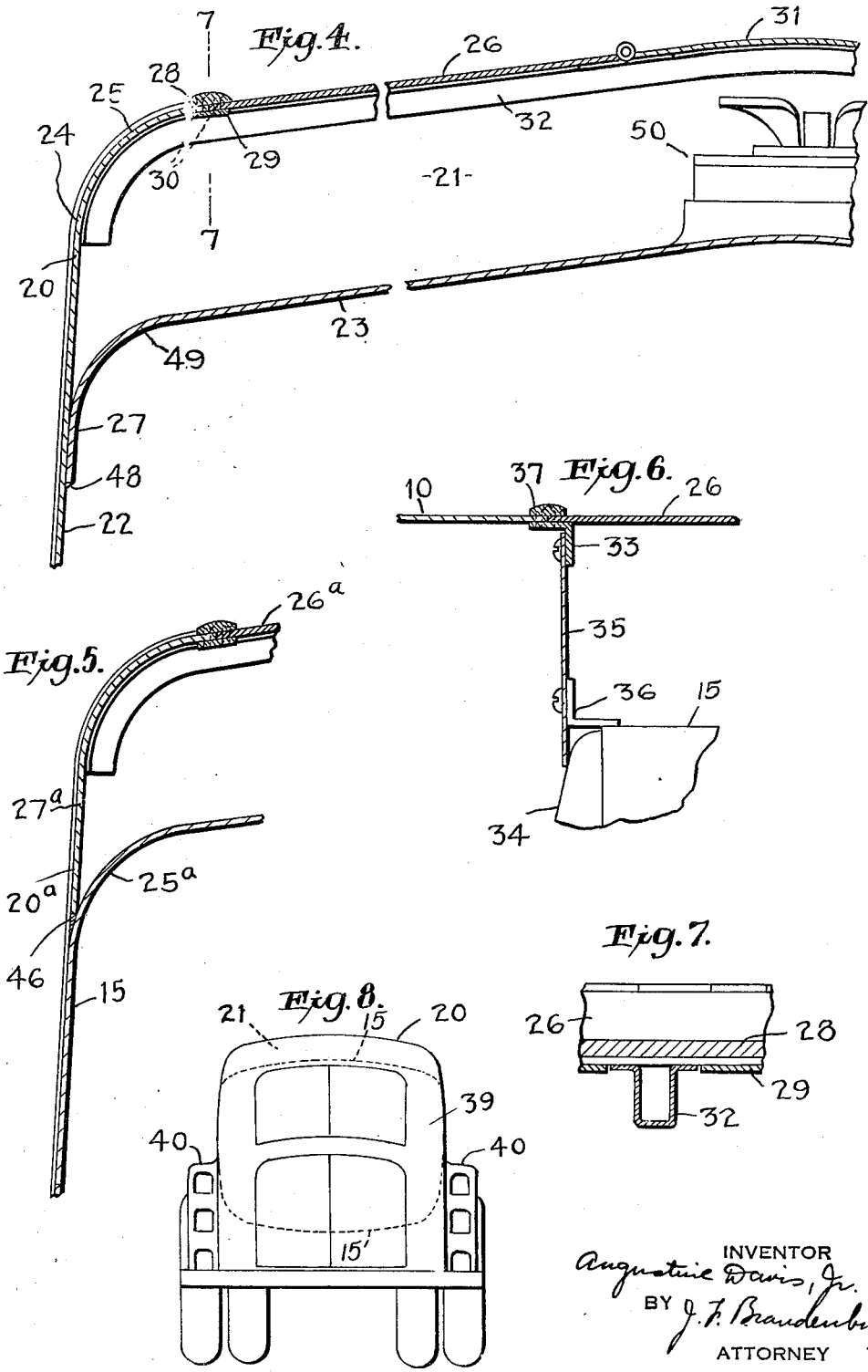

Patented Nov. 30, 1937

2,100,383

UNITED STATES PATENT OFFICE 2,100,383

TRUCK TANK AND CAB

Augustine Davis, Jr., Cincinnati, Ohio

Application April 6, 1934, Serial No. 719,272

2 Claims. (Cl. 280—5)

This invention relates to tank trucks, tank bodies and cabs, and it comprises a tank body of novel construction and a combination of body and cab in an air-penetrating form of low air resistance. An object of the invention is to adapt the tank body so that its lines are more nearly reconciled with those of the cab. Another object is to construct and shape the tank body and the cab so that they make a fair streamline unit. A further object is to provide a construction which makes it practicable to conform the tank body to the cab regardless of the capacity and size of the tank. To these ends, the tank body is constructed with an upper shell which makes the body congruous with the cab and promotes smooth air flow, the cab itself being suitably formed to constitute the forward portion of the entire streamline form. In building this tank body, the distance between the top of the tank and the top of the upper shell can be varied to secure any required capacity for the tank of a body of given cross-section.

Another object is to make it possible to use raised or "domed" manholes or fill-holes and covers, without breaking the streamlining. Still another object is to permit any type of valve mechanism to be used, and to enclose the manholes and any overhead valve mechanism within the streamline form and to protect them from the weather.

Another object is to cheapen the cost of the cab, this resulting from the fact that the front end of the tank body is made to serve as the back of the cab.

Yet another object is to provide a construction which is adapted to the known plan of truck chassis and body in which the cab is over the engine and over the front axle of a four-wheel chassis, so that there is practically as much weight on the front axle as the rear axle so as to get a maximum weight per axle and the maximum load-carrying capacity for the chassis, also a short over-all length for operation on streets and in service stations.

Other objects and features of the invention will become apparent to those skilled in the art as the specification proceeds and from the accompanying drawings, in which:

Fig. 1 is a side elevation of a tank body and cab combination embodying the invention, the body and cab being mounted on a four-wheel chassis with the cab over and extending forward from the front axle;

Fig. 2 is a plan view, an intermediate portion of the body being broken out to economize space on the sheet of drawings;

Fig. 3 is a front elevation;

Fig. 4 is a fragmentary view in cross-section of the tank body, showing one form of the construction;

Fig. 5 is a similar view, still more fragmentary, showing another form of construction;

Fig. 6 is a fragmentary view in vertical longitudinal section, with a portion of the front part of the tank in elevation;

Fig. 7 is a detail section taken on the line 7—7 of Fig. 4; and

Fig. 8 is a rear elevation, on a small scale.

The cab 10 has a blunt front, the lines of which in plan preferably incline gently rearward from the center. In profile or side elevation the lines of the cab preferably rise perpendicularly for a distance and then incline and curve upward and rearward in curves of large radius to merge with the top lines of the cab. The sides of the cab may be substantially vertical, inclining inward somewhat toward the top. The wind-shield 13 and the window in the door 14 are so disposed as to afford good vision.

The tank 15 will be understood as being of the compartmented type. The bulkhead construction and the manner of uniting the compartment sections together need not be illustrated since these matters are well known. The shape of the tank may be varied, but for the purpose of the invention a semi-rectangular shape such as shown in Fig. 8 is specially advantageous. Since the particular manner of mounting the tank and the cab does not enter into the invention, a showing of such familiar details is not included in the drawings.

According to this invention the cross-section of the tank is extended upward by means of an upper shell 20, which encloses a space 21 of substantial depth over the top of the tank. This upper shell is formed in continuation with the lines of the tank and converts the tank from a non-conforming body to a body conformable with the lines of the cab, which it adjoins.

Figs. 4 and 5 show two forms of the unitary construction of the tank and upper shell. In Fig. 4 the side sheets 22 of the tank are extended upward above the tank top sheet 23, which is set inside the side sheets. The extensions 24 of the tank side sheets are flanged inward on a curve 25 of ample radius, and the top sheet 26 of the upper shell is disposed flush with these flanges. The adjoining portions of the sheet 26 and the flanges may be united in different ways, the preferred and economical connection consisting of low external moldings 28 and internal lap bars 29 with rivets 30 connecting them and passing through the sheet metal. The top sheet 23 of the tank, or the liquid containing space of the body has curved side shoulders 49 and downwardly extending flanges 27 which bear against the inner sides of the side sheets and are united to them by internal fluid-tight welds 48. This construction is suitable for steel or any metal or alloy such that the weld will not buckle the outside of the sheet. Arc welding may be used. It will be evident that the tank top may be placed higher or lower in this integral tank and top shell construction so as to adjust the capacity of the tank to the load-carrying capacity of the chassis or to comply with the requirements of laws, and that the tank size does not affect the over-all size and shape of the body.

The central longitudinal portion of the top of the extension shell is cut out to form an opening giving access to the top of the tank, the manholes 50 and manhole covers of the several tank chambers and whatever valve mechanism there may be in the space 21. This opening is closed by a hinged cover 31 which rests on carlines 32. These carlines underlie the entire arch of the upper shell and welded or otherwise united to the shoulders or flanges 25 greatly stiffen the tank body and strengthen the top shell and the cover 31 against injury and so that they may be climbed upon.

A tank body thus constructed has a shape at the front end like that of the rear end of the cab. The front edges of the upper shell 20 aline with the rear edges of the upper portion of the cab, and are preferably joined to them by riveting through an external moulding 37 and an internal angle 33. An advantage of the invention is that the cab may be constructed by the chassis builder, the tank maker building the body to fit the cab. It is not absolutely necessary to join the front end of the tank body to the cab. As long as they conform even a slight gap between them would not appreciably impair the air flow, but the appearance is materially improved by a molding 37 or finish band concealing the edges, and an actual connection gives additional firmness to the construction as a whole.

The cab itself needs no back, this economy being possible since the front or head 34 of the tank forms the back of the cab space. In addition to this, it is simple to provide a partition 35 at the front end of the tank extending from the tank to the supplementary shell 20 so as to complete the enclosure of the cab and keep it warm in cold weather and prevent a draft when the windows are open in warm weather. This partition is secured by screws or otherwise to the angle 33 and to angle clips 36 which are welded to the outside of the tank proper.

Ventilators 38 are placed in the forward portion of the false top or shell to blow out any possible fumes that might collect between the top of the tank and the false work.

It will be seen that the cab and the tank body are congruous and that the tank body extends rearward in straight lines without detrimental breaks or projections. It is one of the advantages of the invention that the manholes are absorbed within the body, and notwithstanding this, that the so-called dome type of manhole may be employed, the manhole domes, which rise from the tank, being cheaper to instal than sunken manholes, and not limiting the capacity of the tank but providing expansion spaces. The term "manhole" as used herein includes filling openings. At the rear end, the tank and top-shell body has a shell 39 welded on and of such form as to complete the streamlining.

At the sides of the tank body there are catwalks 40 with cabinets 41 beneath them. These cabinets and cat-walks would project beyond the lines of the cab, but the cabinet forms have continuations in forms 42 on the sides of the cab, these forms 42 having gradually curved tops 43 which decline from the cat-walks 40 to the tops of the front mud-guards 44.

The tank and top shell construction of Fig. 5 remains to be described. In this construction, which has special advantages when the body is made of aluminum but which may be used with other metals as well, a complete tank proper 15 is made as usual and an upper shell 20ᵃ is applied over the tank and welded to it. For this purpose additional strips or sheets 27ᵃ are curved and flanged inward, and the lower edges of these pieces are welded to the outside of the tank proper at the regions where the shoulders 25ᵃ commence to curve inward, this external weld 46 being subsequently ground off to give a smooth finish. The top sheet 26ᵃ is united to the flanges of the pieces 27ᵃ in the same manner as the top sheet is connected to the flanges in the construction shown in Fig. 4. With this mode of construction the tank is built higher or lower, depending upon the liquid holding capacity that is desired, and the pieces 27ᵃ are cut shorter or longer in the vertical direction as necessary to make the lines and contour of the top of the tank body like those of the cab.

The upper shell is preferably composed of sections corresponding to the sections of the tank, the adjoining ends of the sections being covered by finish bands.

While certain preferred embodiments of the invention have been described in detail, it is desired that the description and drawings be considered to be illustrative rather than limiting.

I claim:

1. In a tank truck having a cab, a tank body adjoining the rearward end of the cab and having a section similar to that of the adjoining end of the cab, so that the tank body and cab make a fair streamline unit, said tank body including a tank substantially lower than the top of the cab to obtain a low center of gravity for the load, manholes in the top of the tank, upwardly extending closures for the manholes, a false top over said tank and closures to conform the tank body to the cab, said false top connecting with the sides of the tank and extending upward from said sides and across the entire top of the tank, said false top including a top shell with carlines extending transversely across its under side at longitudinally spaced lines along the length of the tank body and intermediate the manhole closures, said carlines comprising the sole supporting means for the central portion of the top shell between the ends of the tank body, and a door in the top shell for access to the manhole closures.

2. A truck tank body comprising a tank including sides and a top welded to said sides, a false top for the tank including integral extensions of the tank sides projecting above the connections of the tank top with the sides, transverse carlines extending across the tank body and supported at their ends by the extensions of the tank sides, and a top shell extending across the top of the tank between said extensions of the tank sides and supported by said carlines, the longitudinal edges of the top shell being connected with the upwardly projecting extensions of the tank sides.

AUGUSTINE DAVIS, Jr.